Jan. 31, 1956 J. E. RICHARDSON 2,733,004
ELECTRICAL COMPUTERS
Filed May 26, 1950 3 Sheets-Sheet 1

INVENTOR.
JOHN E. RICHARDSON
BY
Warren T. Jessup
ATTORNEY

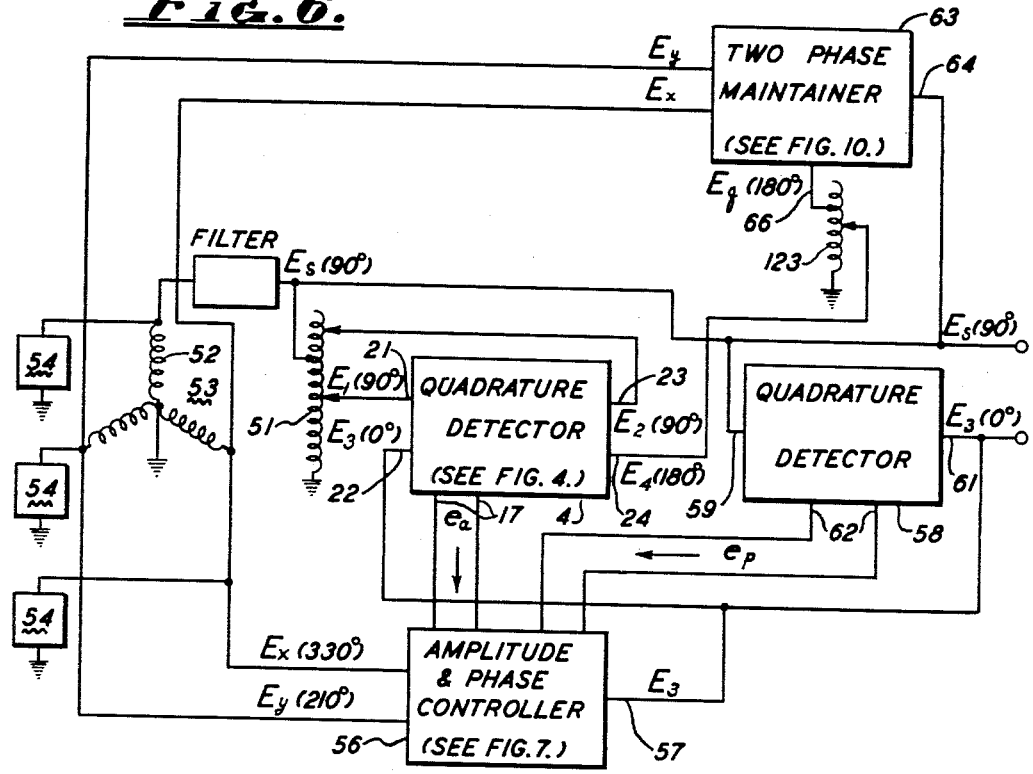
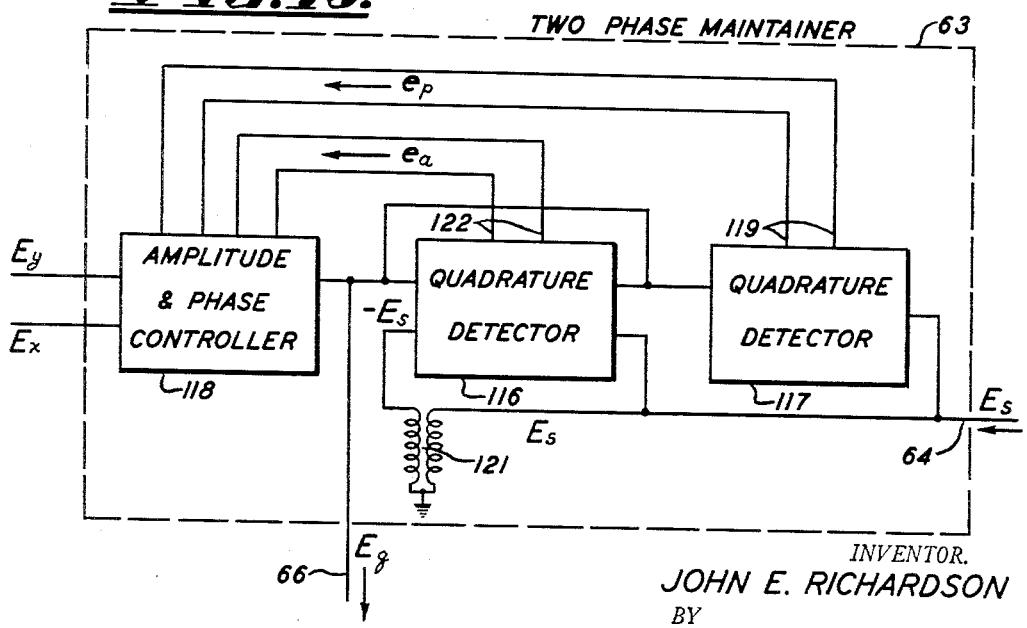

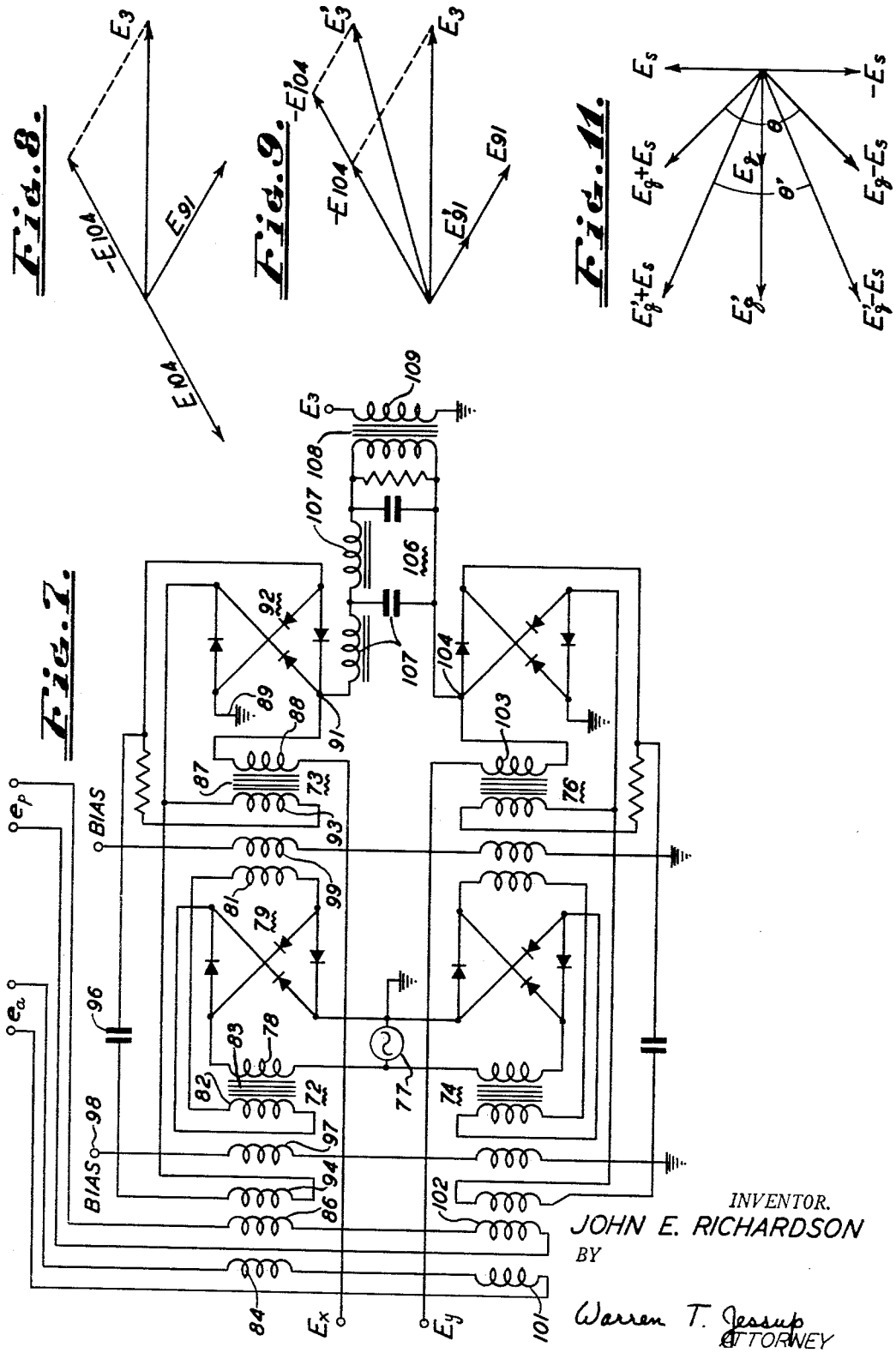

United States Patent Office 2,733,004
Patented Jan. 31, 1956

2,733,004
ELECTRICAL COMPUTERS
John E. Richardson, Pasadena, Calif.
Application May 26, 1950, Serial No. 164,583
5 Claims. (Cl. 235—61)
(Granted under Title 35, U. S. Code (1952), sec. 266)

This invention relates to electrical computers, specifically to a computer for solving the equation $E_1E_2=E_3E_4$.

It is an object of this invention to provide an electrical computer capable of solving the mathematical equation $E_1E_2=E_3E_4$.

It is another object of this invention to provide a two-phase generator or maintainer capable of delivering two A. C. voltages in a precisely maintained, predetermined phase relation, specifically in quadrature.

It is another object of this invention to provide a phase controller capable of controlling and varying the phase of an output voltage in response to an input signal.

It is another object of this invention to provide a phase and amplitude controller capable of controlling and varying the phase and amplitude of an output signal in response to a pair of control signals, one controlling the phase, the other the amplitude.

It is a further object of this invention to provide a voltage generating circuit, specifically a computing circuit, which does not depend on special characteristics of circuit elements, which obviates the use of tubes and of a high voltage D. C. power supply, which is simple in design requiring relatively few adjustments, and which is extremely rugged physically.

Other objects and many of the attendant advantages of this invention will be readily appreciated as the same becomes better understood by reference to the following detailed description when considered in connection with the accompanying drawings, wherein:

Fig. 6 is a schematic diagram illustrating the entire computer forming the principal subject matter of the instant invention;

Fig. 7 is a circuit diagram of a phase and amplitude controller forming another important component of the principal circuit of Fig. 6;

Figs. 8 and 9 are companion vector diagrams illustrating the action of the circuit of Fig. 7;

Fig. 10 is a block diagram of the two phase maintainer, forming one of the components of the circuit of Fig. 6; and Fig. 11 is a vector diagram illustrating the operation of the circuit of Fig. 10.

As stated in the objects, the purpose of the instant computer is to establish a circuit employing A. C. voltages which is capable of solving the equation $E_1E_2=E_3E_4$. In the course of evolving the instant circuit several other useful and closely related inventions accrued, as will be pointed out hereinafter.

Figure 1:
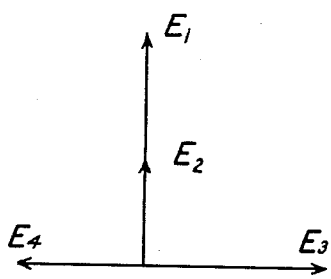
Figs. 1 and 2 are certain vector diagrams illustrating the general principles underlying the instant invention.

Reverting now to the principal problem, i. e. the solution of $E_1E_2=E_3E_4$, Fig. 1 illustrates four hypothesized voltages. $E_1$ and $E_2$ are in phase and of the same sign; $E_3$ and $E_4$ are of opposite sign or polarity, and are displaced 90°, i. e. in quadrature, with respect to $E_1$ and $E_2$.

Figure 2:
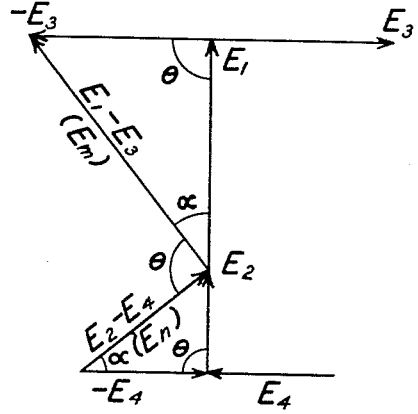

In Fig. 2, $E_3$ has been subtracted from $E_1$ to produce $E_m$, and $E_4$ has been subtracted from $E_2$ to produce $E_n$. The amplitudes of the voltages $E_1$, $E_2$, and $E_4$ have been so chosen that, when combined as shown in Fig. 2, $E_n$ is in quadrature with $E_m$. It will be readily seen from Fig. 2, that with $\theta$ equal to 90°, similar triangles are formed, so that the relation $E_1E_2=E_3E_4$ is established, and will be maintained as long as the magnitudes and phases of $E_1$, $E_2$, $E_3$, and $E_4$ are such as to maintain the angle $\theta$ equal to 90°.

In accordance with the instant invention, $\theta$ in Fig. 2 is kept at 90° by comparing $E_m$ and $E_n$ in a quadrature detector which delivers a control signal, the amplitude of which is proportional to the deviation from quadrature between $E_m$ and $E_n$. This control signal is used to vary one of the voltages $E_1$, $E_2$, $E_3$ or $E_4$ to restore and maintain quadrature between $E_m$ and $E_n$. Generally similar means are employed to maintain quadrature between $E_3$ and $E_1$, and between $E_2$ and $E_4$.

Figure 3:
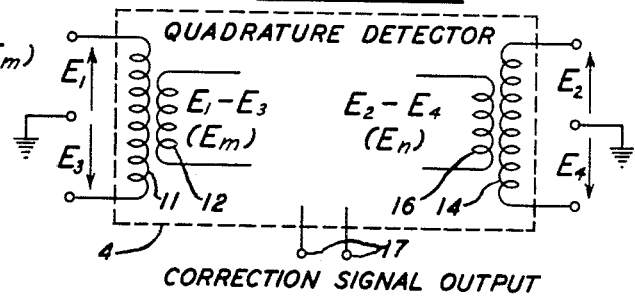
Fig. 3 is a schematic diagram of the quadrature detector forming an important component of the complete computing circuit.

The apparatus for combining the voltages shown in Fig. 1 to produce the combination shown in Fig. 2 is illustrated schematically in Fig. 3, wherein voltages $E_1$ and $E_3$ are applied in opposite sense to the primary winding 11 of a transformer, so that across the terminals of the secondary 12 there results a voltage proportional to $E_1-E_3$, called $E_m$ in Fig. 2. Likewise, to the quadrature detector 4 are applied voltages $E_2$ and $E_4$ to the primary winding 14 of another transformer, so that across the secondary winding 16 appears the vector difference $E_2-E_4$, called $E_n$ in Fig. 2. $E_m$ and $E_n$ are combined in the quadrature detector 4 in a manner to be described hereinafter. As long as these two voltages are exactly in quadrature, the correction signal output at the terminals 17 is zero. Deviation from quadrature between $E_m$ and $E_n$ produces a signal, in this case a D. C. voltage, at the terminals 17, which may be employed by suitable apparatus to restore quadrature between $E_m$ and $E_n$ by suitable influence upon one of the voltages $E_1$, $E_2$, $E_3$, or $E_4$.

Figure 4:
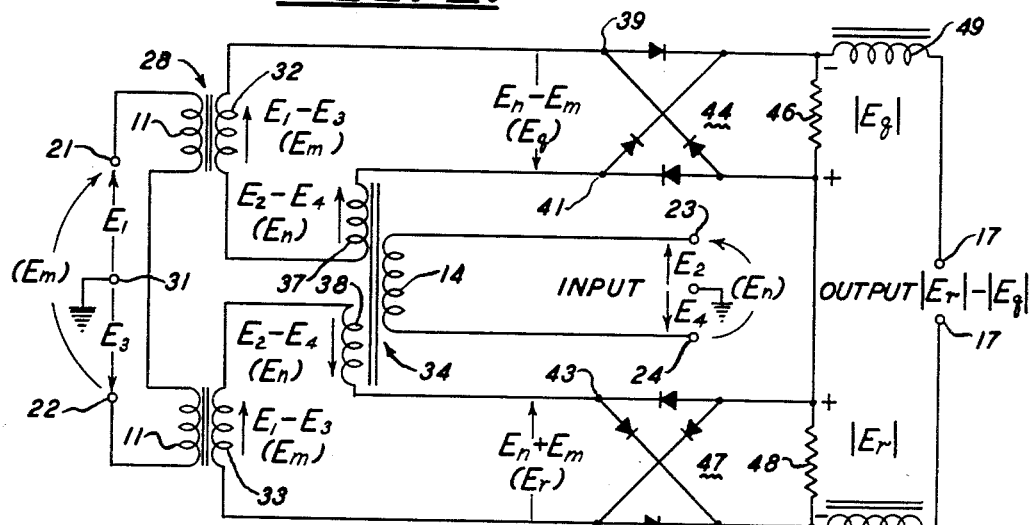
Fig. 4 is a circuit diagram illustrating the complete quadrature detector introduced schematically by Fig. 3.

Fig. 4 illustrates the quadrature detector of Fig. 3 in detail.

In Fig. 4, 21 and 22 represent a first pair of input terminals, and 23 and 24 represent a second pair of input terminals. These inputs are compared in the quadrature detector of Fig. 4, and if the input voltages are out of quadrature a direct voltage proportional to the out-of-quadrature relation between input voltages $E_m$ and $E_n$ appears on the output terminals 17 in a manner which will be presently described.

A first input transformer 28 has its primary winding 11 connected to the first input terminals 21 and 22. Between ground terminal 31 and terminal 21, the voltage $E_1$ is applied. Between ground terminal 31 and terminal 22, the voltage $E_3$ is applied. There is thus applied to the primary 11 the voltage $E_m$ equal to $E_1-E_3$. The transformer 28 has a pair of secondary windings 32 and 33, each coupled to the primary winding 11, so there is generated in each of the windings 32 and 33 a voltage equal to $E_m$.

A second transformer 34 has an input winding 14 connected to the second input terminals 23 and 24. As in the case of the first input, a second input voltage $E_n$ equal to $E_2-E_4$ is applied to the primary 14 of the transformer 34, so that across the two secondaries 37 and 38 of the transformer 34 there appears the voltage $E_n$, equal to $E_2-E_4$.

Winding 32 and winding 37 are so connected that their generated voltages $E_m$ and $E_n$ are subtracted; thus there appears between the terminals 39 and 41 a voltage $E_q$, equal to $E_n-E_m$. Windings 33 and 38 are connected so that their respective generated voltages $E_m$ and $E_n$ are additive; thus there appears across the terminals 42 and 43 a voltage $E_r$, equal to $E_n+E_m$.

The voltage $E_q$ is applied to a full wave rectifier 44 bridged by the load resistor 46, so that across the load resistor 46 appears a voltage $|E_q|$, with the polarity shown, which is uni-directional and equal in magnitude to the amplitude of the alternating voltage $E_q$ applied to the terminals 39 and 41. In similar manner, the voltage $E_r$ is rectified in the full wave rectifier 47, bridged by the load resistor 48 across which appears a voltage $|E_r|$ which has the polarity shown, is uni-directional, and is equal to the amplitude of the alternating voltage $E_r$ applied to the terminals 42 and 43.

As shown in Fig. 4 the resistors 46 and 48 are connected in series, so that the voltages $|E_q|$ and $|E_r|$ are combined in opposite polarity, and then through a pair of chokes 49 to the aforementioned output terminals 17. There thus appears across these terminals a uni-directional potential of magnitude equal to $|E_r|-|E_q|$. That this output voltage varies directly with the out-of-quadrature relation between $E_m$ and $E_n$ may be readily seen by reference to Fig. 5.

Figure 5:
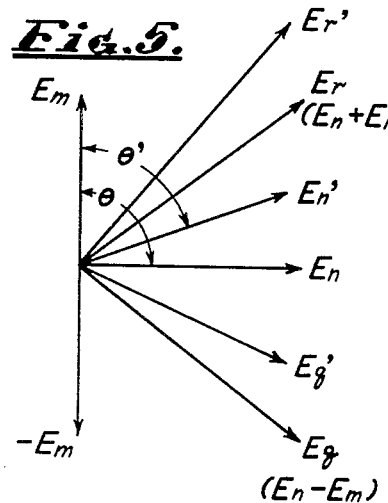
Fig. 5 is a vector diagram illustrating the operation of the circuit of Fig. 4.

In Fig. 5, vectors representing $E_m$ and $E_n$ have been shown in exact quadrature relation ($\theta=90°$). The voltage $-E_m$ has also been illustrated. The voltage appearing between terminals 39 and 41, $E_q$, is shown equal to the vector difference, $E_n-E_m$. The voltage appearing between terminals 42 and 43, $E_r$, is shown equal to the vector sum $E_m+E_n$. As seen in Fig. 5, as long as $E_n$ is in quadrature with $E_m$, the amplitude of $E_q$ is exactly equal to that of $E_r$. Since the resistors 46 and 48 are connected so as to subtract $|E_q|$ from $|E_r|$, the output appearing across the terminals 17 under this condition is zero.

Now let it be supposed that the voltage $E_n$ deviates in quadrature from $E_m$, appearing at $E_n'$ as shown in Fig. 5. It will now be seen that the new $E_q$, called $E_q'$, is appreciably less in amplitude from the new $E_r$, called $E_r'$. Under this condition, the direct voltage appearing across the resistor 48 will be greater than that appearing across the resistor 46, and a D. C. output voltage will appear between the terminals 17. As shown in Fig. 4, this output voltage will be such as to make the upper terminal 17 positive with respect to the lower terminal 17. Should $E_n$ lag in phase instead of advance, the output on upper terminal 17 would be negative with respect to lower terminal 17.

Reverting now to Figs. 2 and 4, it will be seen that if $E_1$ and $E_3$ are maintained in quadrature, and $E_2$ and $E_4$ are likewise maintained in quadrature, $E_1$ and $E_2$ being in phase, then no output voltage will appear on the terminals 17, as long as the magnitudes of these four voltages are such as to place $E_m$ in quadrature with $E_n$. If now, $E_4$ for example, should increase in amplitude, all other conditions being the same, then $E_m$ will no longer be in quadrature with $E_n$, and a D. C. output voltage will appear at the terminals 17. The manner in which this output voltage, called an amplitude control signal, is used to maintain quadrature between $E_m$ and $E_n$ will now be described.

Referring to Fig. 6, the quadrature detector 4 is shown having $E_1$ applied at terminal 21, $E_3$ applied at terminal 22, $E_2$ applied at terminal 23, and $E_4$ applied at terminal 24. $E_1$ and $E_2$ are in phase and of the same polarity, being taken from a common source such as autotransformer 51 connected between ground and one phase 52 of a three-phase generator 53. Generator 53 constitutes the source of supply for operation of the circuit of Fig. 6, and the voltage generated in its phase 52 is regarded as the voltage of standard phase (and standard amplitude) $E_s$. It will be assumed that the generator 53 is also used to supply other miscellaneous loads 54 connected to its three phases.

It will now be recalled that when the quadrature detector of Fig. 4 is perfectly balanced so that there is no output at the terminals 17, then the following relationship holds: $E_1E_2=E_3E_4$. Let it now be assumed that the computing circuit of Fig. 6 is to solve the equation $E_3=E_1E_2/E_4$. $E_3$ is now the dependent variable; any of the other three quantities, $E_1$, $E_2$, and $E_4$ may be varied as desired. For the sake of illustration, it will be assumed that $E_1$ is to be varied by sliding the connecting point of terminal 21 along the auto-transformer winding 51, $E_2$ and $E_4$ being kept constant in this example. Referring to Fig. 2, if $E_1E_2=E_3E_4$, the diagram will be as shown. If now $E_1$ is increased in amplitude by moving of the slider, and all other conditions remain the same, then $E_m$ will be retarded in phase, so that quadrature will no longer exist between $E_m$ and $E_n$. An output voltage will then appear across the terminals 17.

It is the function of the amplitude and phase controller 56, shown in Fig. 6, to accept this control voltage $e_a$, and employ it to change the amplitude of $E_3$ so as to restore quadrature between $E_m$ and $E_n$. As seen in Fig. 2, this will amount to increasing $E_3$ an amount proportional to the increase in $E_1$, thereby maintaining $E_3=E_1E_2/E_4$.

Amplitude and phase controller 56 will be described in detail hereinafter. At the moment it will suffice to say that it constitutes a circuit capable of placing on its output terminal 57 an alternating voltage whose amplitude is directly controlled by an amplitude signal $e_a$, received from the quadrature detector 4 and whose phase is controlled by a phase control signal $e_p$, received from another quadrature detector 58, substantially identical in construction to that shown in Fig. 4.

Up to now it has been assumed that the four fundamental voltages, $E_1$, $E_2$, $E_3$, and $E_4$, introduced in the discussion of Fig. 1, remain conveniently in the quadrature phase therein illustrated. This of course does not happen by chance. It is necessary to provide apparatus to closely maintain this quadrature relation. This apparatus will now be described with further reference to Fig. 6 and Fig. 2.

It has been shown above that if the quadrature relation of Fig. 1 is maintained, then the quadrature detector 4, in conjunction with the amplitude and phase controller 56, will operate to continuously control the amplitude of $E_3$ thereby to continuously solve the equation $$E_3=E_1E_2/E_4$$

It remains to show how the quadrature relations of Fig. 1 are maintained. $E_1$ and $E_2$ are maintained in phase simply by being tapped from a common source shown in Fig. 6 as an autotransformer 51 connected to the source of $E_s$. $E_3$ is maintained in quadrature with $E_1$ (and $E_2$) by being continuously compared with $E_s$ in the quadrature detector 58. The standard voltage $E_s$, with which $E_1$ is always in phase, is applied to the terminal 59 of the quadrature detector 58, while the voltage $E_3$, taken from the output terminal 57 of the controller 56, is applied to the terminal 61 of the quadrature detector 58. Detector 58 is the same as that illustrated in Fig. 4 except that each of the two inputs consists of a single voltage instead of a pair of voltages added together. The voltage $E_s$ applied to the terminal 59 corresponds to the voltage $E_m$ of Fig. 4, and the voltage $E_3$ applied to the terminal 61 corresponds to the voltage $E_n$ of Fig. 4. There thus appears on the output terminals 62 corresponding to the terminals 17 of Fig. 4, a direct voltage whose magnitude is proportional to the out-of-phase relation between $E_s$ and $E_3$. This voltage, called $e_p$, is applied to the amplitude and phase controller 56 so as to control the phase of $E_3$ in a manner to be described hereinafter.

There now remains only the problem of maintaining $E_4$ in quadrature with the standard voltage $E_s$. This is done by the use of a "two phase maintainer" 63 to be described hereinafter. At the moment it will suffice to say that the apparatus 63 accepts the voltage $E_s$, of standard phase and amplitude, upon its terminal 64, and delivers at its terminal 66 a voltage $E_q$ which is always of amplitude equal to $E_s$ and always in a predetermined phase relation thereto, in this case 90°.

There has now been shown in Fig. 6 the manner in which the phase relations illustrated in Fig. 1 are maintained, and the manner in which the amplitude of the voltage $E_3$ is continuously varied to maintain the quadrature relations shown in Fig. 2 between $E_m$ and $E_n$. Thus the computing circuit is capable of continuously solving the equation $E_3=E_1E_2/E_4$. It is obvious that squares and square roots may be readily solved by this apparatus, these being but special cases of the general equations given above. For example, by taking $E_1$ and $E_2$ from the same point on transformer 51, they are made equal, and $E_3=E_1^2/E_4$. Similarly, by dispensing with the two phase maintainer 63 and connecting terminal 24 to terminal 57, $E_4$ is made equal to $E_3$ and the equation becomes $E_3^2=E_1E_2$. By holding $E_2$ constant and varying $E_1$, the equation becomes $E_3=K\sqrt{E_1}$.

The detailed functioning of the amplitude and phase controller 56 will now be described with reference to Figs. 7, 8, and 9.

The phase and amplitude controller illustrated in Fig. 7 employs four magnetic amplifiers 72, 73, 74, and 76. Such devices are known in the art, and constitute generally a saturable reactor which receives an A. C. voltage across one winding of the amplifier, the current through this winding being controlled by the degree of saturation of the amplifier's core, which is in turn controlled by the current in a series of auxiliary windings, generally carrying direct current. Considering for example the magnetic amplifier 72, a suitable source of A. C. voltage 77 is connected to apply an A. C. current to the winding 78 through a full wave rectifier 79, bridged by a load winding 81, in series with a positive feedback winding 82. The impedance presented by the A. C. winding 78 is a function of the saturation of the core 83, which is in turn controlled by the amplitude of the D. C. current in an amplitude control winding 84 and a second winding 86 constituting a phase control winding. To the winding 84 is applied the amplitude control signal $e_a$ from the terminals 17 of the quadrature detector 4 (Fig. 6). To the winding 86 is applied the D. C. voltage $e_p$ derived from the terminals 62 of the quadrature detector 58. The magnitude of the A. C. current flowing through the winding 78 is thus directly under the control of the voltages $e_a$ and $e_p$; likewise the magnitude of the direct current flowing through the winding 81 is also controlled since this is simply the current of the winding 78 rectified in the rectifier 79. The effect of the positive feedback winding 82 is simply to increase the sensitivity or gain of the amplifier 72.

The amplifier 73 is similar to the amplifier 72 with the winding 81 constituting the means for varying the flux saturation of the core 87, which is fed by an A. C. voltage applied to the winding 88. This voltage comes from a source denoted $E_x$ in Fig. 7, which will be described hereinafter. Output from the amplifier 73 appears as an A. C. potential between the ground point 89 and the terminal 91. The full wave rectifier bridge 92, which feeds the positive feedback winding 93, constitutes a load impedance across the terminals 89 and 91.

Summarizing, the amplifiers 72 and 73 constitute a means for controlling the magnitude of an A. C. output voltage appearing at the point 91 in accordance with the respective magnitudes of a pair of D. C. control signals $e_a$ and $e_p$. The windings 84 and 86 are so arranged that an increase in the D. C. voltage $e_a$ increases the amplitude of the A. C. voltage at the point 91 and similarly an increase in the voltage control signal $e_p$ also increases the amplitude of the A. C. voltage at 91. As will be readily obvious, a single amplifier may be employed instead of the two stages 72—73, providing enough gain can be realized in a single stage.

Winding 94 in series with capacitor 96 across the bridge rectifier 92 constitutes a derivative feedback control which tends to stabilize the amplifiers and prevent hunting. A bias winding 97 is shown for the amplifier 72 by means of which the operating point of the saturable core 83 may be selected at will by applying any desired bias to the terminal 98. The amplifier 73 has a similar biasing winding 99.

Amplifiers 74 and 76 are substantially identical, respectively, to 72 and 73, being connected in substantially the same manner. The amplifier 74 has a pair of control windings 101 and 102 connected in series, respectively, with the windings 84 and 86 of the amplifier 72. An external A. C. voltage $E_y$ is applied to the final winding 103 so that the amplitude of the A. C. voltage appearing at the point 104 is controlled by the currents in the respective windings 101—102. These windings, however, are wound in such a fashion that increase in the control signal $e_a$ increases the A. C. amplitude at 104, while increase in the control signal $e_p$, unlike that of winding 86, decreases the amplitude of the voltage at 104. The effect of this arrangement is as follows. Assume that conditions are such that $E_{91}$ (Figs. 8 and 9), the voltage at point 91, is equal in amplitude to the voltage $E_{104}$ at point 104. If now the signal $e_a$ should increase, then $E_{91}$ and $E_{104}$ would both be affected in the same sense, i. e., both output voltages would increase an equal amount, so that balance would remain between the two. Now, however, if the signal $e_p$ should increase, the influence on the output voltages would be in opposite senses; that is, $E_{91}$ would increase while $E_{104}$ would decrease.

The output voltages $E_{91}$ and $E_{104}$ are vectorially added in an output impedance 106 comprising filter elements 107, designed to eliminate undesirable harmonics which feed a transformer 108, from the secondary winding 109 of which a final output voltage $E_3$ is obtained, equal to the vector difference, $E_{91}-E_{104}$.

Referring to Figs. 6 and 7, the nature of the voltages $E_x$ and $E_y$, feeding the amplifiers 73 and 76, respectively, will now be examined. $E_x$ and $E_y$ are taken respectively from two phases of the three-phase generator 53, and are therefore 120° out-of-phase with each other and with $E_s$. From Fig. 7, it will be seen that $E_x$ becomes $E_{91}$, suitably amplitude controlled by the winding 88. Likewise $E_y$ becomes $E_{104}$ after amplitude control by the winding 103. Assuming a transformation ratio in the transformer 108 of one-to-one, the voltage $E_3$ is equal to $E_{91}-E_{104}$. This has been plotted in Fig. 8, wherein $E_3$ has been shown equal to $E_{91}-E_{104}$.

Referring now to Figs. 8 and 9, and recalling the operation of the controller shown in Fig. 7, it will be readily seen that if $E_{91}$ and $E_{104}$ are both increased in amplitude an equal amount, then $E_3$ will be correspondingly increased in amplitude although its phase will be unchanged. Referring to Fig. 9, it will be seen that if the control signal $e_p$ is changed so as to decrease $E_{91}$ to a value $E_{91}'$, the voltage $E_{104}$ will be increased to a value $E_{104}'$. This will change the phase of $E_3$ to the position $E_3'$ as shown. While the amplitude of $E_3$ will also be changed, this is a second order effect, and may be neglected, particularly since the over-all operation of the circuit of Fig. 6 will tend to maintain the amplitude of $E_3$ at the desired value anyway by operation of the amplitude signal $e_a$.

Now it may be asked why the complicated phase control in 56 is needed when $E_x-E_y$, so conveniently falls into quadrature with $E_s$ anyway. The answer lies in the ancillary loads 54. The apparatus shown herein is designed to use a standard source of three phase power 53 which must supply many loads that will not necessarily be balanced. Unbalance in the loads 54 will cause a shift in phase of the terminal voltages $E_s$, $E_x$, and $E_y$ so that quadrature between $E_s$ and $E_x-E_y$ cannot be maintained within the tolerance required for the accuracy needed in the instant computing apparatus.

The operation of the amplitude and phase controller 56 may now be summarized as follows. An alternating output voltage $E_3$ is controlled in amplitude by a D. C. control signal $e_a$ applied to the controller, and is controlled in phase by a D. C. phase signal $e_p$, also applied thereto.

There now remains to describe in detail only the two-phase maintainer 63, whose function is to accept at its terminal 64 the voltage $E_s$ of standard amplitude and phase, and to deliver at its output terminal 66 a voltage $E_q$ which is always of equal amplitude and 90° displaced from $E_s$.

The two-phase maintainer 63 is shown schematically in Fig. 10; it consists essentially of three parts: a pair of quadrature detectors 116 and 117 similar to the detector shown in Fig. 4, and an amplitude-and-phase controller 118 similar to the apparatus shown in Fig. 7. As shown, the quadrature detector 117 is connected to maintain quadrature between $E_s$ and $E_q$. Should $E_q$ deviate in quadrature from $E_s$, then a signal appears on its output terminals 119, this signal being the phase correction signal fed to the controller 118. As described in connection with Fig. 7, the controller 118 then changes the phase of its output voltage $E_q$, so that it returns to quadrature with $E_s$.

The function of the quadrature detector 116 is to maintain equality of amplitude between $E_q$ and $E_s$. To the lefthand side of detector 116 is applied the voltage $E_q$, and also the voltage $E_s$, after a reversal of sign or sense in the transformer 121. As in the case of the apparatus of Fig. 4, there is thus applied to one side of the detector 116 a voltage equal to $E_q+E_s$. To the right hand side of the detector 116, the voltages $E_q$ and $E_s$ are applied directly; therefore (referring to Fig. 4) the right hand side of the detector 116 receives a voltage equal to $E_q-E_s$.

Referring now to the vector diagram of Fig. 11, it will be seen that as long as $E_q$ and $E_s$ are equal in amplitude (their phase always being maintained in quadrature by the detector 117 and controller 118), then the angle $\theta$ between the vectors $(E_q+E_s)$ and $(E_q-E_s)$ is always 90°. Therefore there is no control signal appearing on the terminals 122 of the detector 116.

Now suppose that $E_q$ should increase in amplitude to the value $E_q'$. The two vectors $(E_q+E_s)$ and $(E_q'-E_s)$ are now changed in phase, so that the angle $\theta'$ is less than 90°. Under this circumstance, an amplitude control signal appears on the terminals 122 of the detector 116, which is fed to the amplitude control windings of the controller 118, causing the amplitude of $E_q'$ to decrease back to its original value, equal to $E_s$.

It is thus seen that the two-phase maintainer 63 operates continuously to maintain $E_q$ of amplitude equal to $E_s$, and of phase 90° displaced therefrom.

Operation

The over-all operation of the computing circuit of Fig. 6 will now be briefly summarized. From a standard voltage $E_s$ applied to the transformer 51, a pair of voltages $E_1$ and $E_2$ are applied to the quadrature detector 4. $E_s$ is also applied to the two phase maintainer 63, from which a voltage $E_q$ is derived. $E_q$ is maintained in quadrature with $E_s$ and of amplitude equal to $E_s$ by the action of the apparatus 63. From an autotransformer 123 fed by $E_q$, is taken the voltage $E_4$, which is always in quadrature with $E_s$ and of any selected amplitude. $E_4$ is vectorially combined with $E_2$ in the quadrature detector 4 to produce $E_n$ equal to $E_2-E_4$.

$E_s$ is also applied to the quadrature detector 58, and is there matched against the voltage $E_3$, applied to its terminal 61, which voltage is derived from the amplitude and phase controller 56. Through the D. C. phase control signal $e_p$ derived at the terminal 62, and fed to the phase controlling portion of the controller, the phase of $E_3$ is constantly maintained in quadrature with that of $E_s$ by the operation of the detector 58.

$E_3$ is also fed to terminal 22 of the quadrature detector 4, where it is combined with $E_1$ to produce $E_m$, equal to $E_1-E_3$ (Fig. 2). $E_m$ and $E_n$ are combined within the quadrature detector 4 and any deviation from quadrature therebetween appears as a D. C. amplitude controlling signal $e_a$ on the terminals 17. This signal $e_a$ applied to the controller 56 controls the magnitude of $E_3$ so as to preserve quadrature between $E_m$ and $E_n$ (Fig. 2) at all times. With quadrature maintained as shown in Fig. 2, $E_3$ is always maintained so as to satisfy the equation $E_3 = E_1 E_2 / E_4$.

It will be readily seen from Fig. 6 that not only has a very useful computing circuit been herein disclosed, but also a means 63 for accurately and precisely deriving a voltage ($E_q$) which is always maintained in amplitude equal to a standard ($E_s$) and in quadrature with the standard.

In addition, the instant invention has included as an integral component thereof, the unique amplitude and phase controller illustrated in Fig. 7 which forms an important operating element of the circuit.

A computing circuit according to the instant invention has been built to have a range of 1 to 5, with a full scale error of 2%. Using 400 cycle voltages, the weight of the entire computer is 1.5 pounds, and the power consumption less than 2 watts.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for delivering a pair of output voltages of predetermined relative phase, comprising sources of voltages of phases I, I, and III, respectively, combining means connected to sources of phase II and III, respectively, effective to vectorially combine the corresponding voltages to derive an output voltage of phase IV, and phase detecting means effective to receive as inputs said phase I voltage and said phase IV voltage and to deliver as an output a control signal in response to deviation from said predetermined relative phase between phase I voltage and phase IV voltage, said combining means including amplitude control means connected to the output of said phase detector to receive said control signal and effective to increase the phase II voltage and simultaneously decrease the phase III voltage in response to a given change in control signal, and vice versa, whereby the phase angle of phase IV with respect to phase I is maintained as said predetermined relative phase.

2. Phase and amplitude controller for an analog computer comprising a pair of magnetic A. C. amplifiers each effective to control output magnitude in response to a control signal, voltage means connected to apply a pair of A. C. voltages of generally predetermined phase spacing, respectively, one to each of said amplifiers, phase control means connected to apply a phase control signal to one of said amplifiers in a positive sense and to the other of said amplifiers in a negative sense, so that increase in signal increases the output magnitude of one of said amplifiers and simultaneously decreases the output magnitude of the other of said amplifiers, and vice versa, amplitude control means connected to apply an amplitude control signal to both of said amplifiers in the same sense, and output impedance means connected to said amplifiers to combine the respective A. C. output voltages therefrom.

3. An electrical computer comprising means for deriving an A. C. voltage proportional to each of the quantities $E_1$, $E_2$, $E_3$, and $E_4$ such that $E_3$ and $E_4$ are 90° out of phase with respect to $E_1$ and $E_2$, $E_1$ is in phase with $E_2$, and $E_3$ is 180° out of phase with $E_4$; means for applying voltages corresponding to $E_1$ and $E_3$ to transformer means effective to vectorially combine $E_1$ and $E_3$ means for applying voltages corresponding to $E_2$ and $E_4$ to transformer means effective to vectorially combine $E_2$ and $E_4$; means for applying the combined voltage corresponding to $E_1$ and $E_3$ and combined voltage corresponding to $E_2$ and $E_4$ to a phase detector effective to produce an output signal proportional to the deviation from quadrature of said combined voltages; and means for applying said phase detector output signal to modulator means effective to control the amplitude of at least one of the voltages corresponding to the quantities $E_1$, $E_2$, $E_3$, and $E_4$ in such manner that said combined voltages approach a quadrature phase relationship, said modulator means comprising first and second saturable cores, means for supplying an A. C. voltage in phase with the voltage the amplitude of which is to be controlled, first and second amplitude control windings connected in series and surrounding said first and second cores respectively and effective when energized to saturate both cores in the same direction, first and second bias windings connected in series and surrounding said first and second cores respectively and effective when energized to saturate both cores in the same direction, first and second phase control windings connected in series and surrounding said first and second cores respectively and effective when energized to saturate said cores in opposing directions, means for connecting said A. C. supply voltage source across said first and second A. C. voltage supply windings, means for connecting the output signal of said phase detector across said first and second amplitude control windings, a second phase detector, means for connecting the voltage on said A. C. supply windings as one input to said second phase detector, means for connecting a voltage at quadrature with the voltage the amplitude of which is to be controlled as the second input to said second phase detector, and means for connecting the output signal of said second phase detector to said first and second phase control windings.

4. A computer for solving the equation $E_1E_2 = E_3E_4$ of which $E_1$, $E_2$, and $E_4$ have a predetermined amplitude, comprising A. C. voltage sources $E_1$, $E_2$, $E_3$, and $E_4$, delivering the respective named voltages, $E_1$ and $E_2$ being in phase with each other, $E_3$ and $E_4$ being out of phase with each other and in quadrature with $E_1$ and $E_2$, first and second transformer primary windings connected in series with said voltage sources $E_1$ and $E_3$, a third transformer primary winding connected in series with said voltage sources $E_2$ and $E_4$, first and second transformer secondary windings connected in series and inductively coupled to said first and third primary windings respectively, third and fourth transformer secondary windings connected in series and inductively coupled to said second and third primary windings respectively, rectifier means for rectifying the voltage on said first and second secondary windings, rectifier means for rectifying the voltage on said third and fourth secondary windings, means for algebraically adding said rectified voltages, a saturable magnetic core, a first core winding disposed about said core, means for connecting said added rectified voltages across said first core winding, a second core winding disposed about said core, means for connecting A. C. voltage source $E_3$ across said second core winding, a bias winding disposed about said core and connected to a fixed D. C. voltage effective to partially saturate said core, and means for feeding back the voltage output $E_3$ on said second core winding into said first and second transformer primary windings.

5. Apparatus for delivering two single frequency voltages in predetermined phase and amplitude relation, comprising a phase detector effective to deliver a control signal in response to deviation from said predetermined phase relation of a pair of input voltages of identical frequency, a phase controller effective to deliver a voltage of variable phase controlled by said signal, electrical means connecting said phase detector to said phase controller effective to apply said signal to said phase controller, means for applying the first of said pair of input voltages to said phase detector, electrical means connecting said phase controller to said phase detector effective to apply said voltage of controlled phase to said detector as the second of said two voltages, an amplitude detector effective to deliver a control signal in response to deviation from said predetermined amplitude relation of said pair of input voltages, an amplitude controller effective to control the amplitude of said voltage of variable phase controlled by said phase controller, electrical means connecting said amplitude detector to said amplitude controller effective to supply said amplitude control signal to said amplitude controller, means for applying the first of said pair of input voltages to said amplitude detector, and electrical means connecting said amplitude controller to said amplitude detector effective to apply said voltage of controlled amplitude to said amplitude detector as the second of two input voltages.

References Cited in the file of this patent

UNITED STATES PATENTS

| | | |
|---|---|---|
| 1,968,068 | Blancard et al. | July 31, 1934 |
| 2,238,249 | Crosby | Apr. 15, 1941 |
| 2,341,280 | Ludbrook | Feb. 8, 1944 |
| 2,489,996 | Ziebolz | Nov. 29, 1949 |
| 2,508,270 | Konigsberg | May 16, 1950 |
| 2,509,738 | Lord | May 30, 1950 |

FOREIGN PATENTS

| | | |
|---|---|---|
| 620,867 | Great Britain | Mar. 31, 1949 |

OTHER REFERENCES

"Electronic Instruments," Greenwood, Holdan and MacRae, first edition, 1948; McGraw-Hill Book Co., Inc., New York (Figure 14—5 relied upon).

"Electron-Tube Circuits," Samuel Seely; published by McGraw-Hill, first edition, 1950, page 380, Figure 17—18.